United States Patent Office 3,511,722
Patented May 12, 1970

3,511,722
METHOD OF MAKING A NUCLEAR PARTICLE DETECTOR
Johannes Meuleman, Caen, France, assignor to U.S. Philips Corporation, New York, N.Y., a corporation of Delaware
Filed Sept. 22, 1966, Ser. No. 581,337
Claims priority, application France, Sept. 24, 1965, 32,625
Int. Cl. H01l 7/36
U.S. Cl. 148—175                    8 Claims

ABSTRACT OF THE DISCLOSURE

A method of manufacturing a nuclear particle detector comprising a $dE/dx$ detector and an E detector united in a common semiconductive wafer, wherein on a substrate of one type conductivity is provided, preferably by diffusion, a surface layer of the opposite type conductivity to form the E detector, on the surface of which is epitaxially grown a thin high resistance semiconductive layer into or on which is provided a second region of the original one type conductivity to form a $dE/dx$ detector. The advantages include simplified manufacture plus reduced series resistances and depletion regions for both of the detectors of adequate thickness.

---

Figure 1:
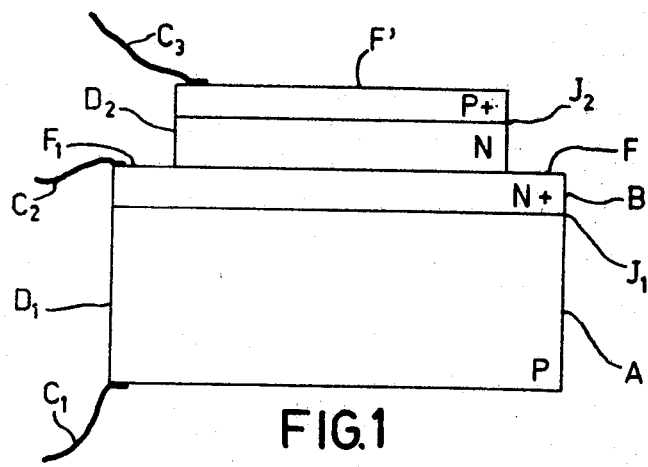

It is known that the discrimination of particles of different masses having an energy between 10 and 50 mev. is substantially impossible by means of the usual detectors. It is also known that one of the methods resulting in such a discrimination consists in simultaneously measuring the energy E of a particle and the differential coefficient of said energy in a detector having, for example, a thickness $\Delta x$.

As a matter of fact, the theoretical calculations show that for a mass particle $m$ having energy E carrying a charge equal to $z$ times that of the electron, the differential coefficient $dE/dx$ is substantially equal to $Kmz^2/E$, in which expression K is a constant which depends upon the absorbing substance.

If a particle traverses a detector of a very small thickness it may reasonably be admitted that the energy $\Delta E$ lost in said detector is proportional to $\Delta x$, and if this detector is very thin it may be said that $\Delta E/\Delta x$ is equal to $dE/dx$. Such a detector bears the name of $dE/dx$ detector.

If the particle, after having traversed this detector of small thickness $\Delta x$, penetrates into a detector of a large thickness from which it does not emerge, it delivers all its available energy $E-\Delta E$ to said detector which energy may be said to be equal to the initial energy E, $\Delta E$ being very weak with respect to the latter. Such a detector having a large thickness is termed E-detector.

It is possible to arrange that the signal supplied by any of these two detectors is a linear function of the energy absorbed by any of them. The product of these signals consequently is a linear function of the product E. $dE/dx$, that is to say that it is proportional to $mz^2$.

In a certain energy range the response of a device indicating said product thus is independent of the energy of the incident particle and proportional to a quantity which may be considered as specific of a given type of particles. This method permits of discriminating perfectly the particles of different natures and, provided that $z$ is known, $m$ may be determined.

Semiconductor devices are already known which use this method and are based on the fact that if a junction is polarized in the opposite direction, the depletion zone behaves with respect to particles as a solid state ionisation chamber. These known devices are constructed from an assembly of two detectors which are separately manufactured beforehand. The detector having the large thickness and destined for measuring the energy of the particle is, for example, a suitably doped silicon wafer, having a thickness between approximately a hundred and a few hundred microns dependent upon said energy, in which an appropriate junction has been made, for example, by diffusion.

The $dE/dx$ detector is constituted by a suitably doped semiconductor wafer in which a junction has been made. The smaller the thickness of said wafer is, the more the detected signal can be considered to be analogous to the differential coefficient of the energy for the value it has when the particle is incident; it is therefore endeavoured to make said wafer as thin as possible. However, since the amplitude of the signal diminishes with the thickness of wafer results in a compromise between these two requirements, which compromise depends upon the energy and the nature of the particles to be detected.

This thin wafer is usually obtained by lapping a thicker wafer and towards the end of said operation handling of the wafer is very difficult as a result of its thinness and, moreover, the wafer is extremely fragile. This consequently is a very delicate operation.

This wafer must then be assembled with the thick wafer to form a single device the mounting of which must be realized with a very great precision in particular as regards the parallelism of the two detectors; the thinness of the wafer renders these operations delicate as a result of the fragility of the wafer, and the handling difficulties they introduce. It is thus impossible to diminish the thickness of the thin detector to values lower than approximately 20 microns, handling wafers having a thickness of from 10 to 20 microns being extremely difficult.

The present invention obviates these difficulties and relates to a method of manufacturing a particle detector comprising two superposed semiconductor detectors having junctions polarized in the blocking direction, one of which is thick and is destined for measuring the energy of the said particles, while the other is thin and is meant for measuring the differential coefficient of said energy with respect to the path traversed in the said detection device, which is characterized in that the said thin detector is formed in an epitaxial semiconductor layer deposited on the thick detector after formation of the semiconductor junction of the said detector. In a first embodiment of the method according to the invention, the epitaxial layer is of the same conductivity type as the diffused zone of the thick detector on which it is deposited and a junction is formed in the said epitaxial layer by a diffusion method or by forming a surface barrier layer to obtain the very thin detector. In this manner a detection device is obtained comprising four superposed zones, one thick zone the conductivity type of which is that of the original wafer and having a low impurity concentration, one thin diffused zone the conductivity type of which is opposite to that of the original wafer and having a strong impurity concentration, one zone which is less thick and is of the same type as the preceding zone but having a low impurity concentration, and one very thin zone of the type opposite to that of the preceding zone, that is to say of the same type as the original wafer, and having a strong impurity concentration. Thus a np+pn+ or pn+np+ structure is obtained.

In a second embodiment of the invention the epitaxial layer is of the conductivity type opposite to that of the diffused zone on which it is deposited and the junction between said epitaxial layer and the diffused layer constitutes the very thin detector. Thus a simple assembly of three zones is obtained. The epitaxial zone may be more strongly doped than the original wafer.

It is to be noted that in either embodiment according to the invention, after the contacts have been provided at suitable places, adequate voltages must be applied to the detector. In particular the voltages applied to the thin detector must be such that the zone of space charge extends throughout the thickness of the epitaxially deposited layer.

This construction and method have several advantages. The epitaxial method permits of obtaining layers which are very thin (for example, 2 or 3µ thickness), and thus realizing a $dE/dx$ detector having a thickness smaller than that obtained by any other method.

In addition, all the detection devices which are constituted by two detectors separately manufactured and then assembled require a very precise mechanical assembly and comprise between the two semiconductor wafers of these detectors a window the presence of which may entail errors; the present invention makes said mechanical assembly and said window superfluous which means an additional advantage of the present invention.

In order that the invention may readily be carried into effect, it will now be described in greater detail, by way of example, with reference to the accompanying drawing.

FIG. 1 shows a device according to the invention, in which reference $D_1$ denotes the thick detector destined to absorb the energy $E-\Delta E$ of the incident particles and $D_2$ denotes the thin detector destined to supply a signal analogous to the differential coefficient of the energy for the value it has when the particle is incident. The detector $D_1$ is constituted by a wafer of approximately 100 microns or more, said thickness determining the maximum energy range which the device can detect. In this wafer, the junction $J_1$ has been made by diffusion.

According to the present invention, this monolithic assembly has been obtained by first providing the junction $J_1$ in a semiconductor wafer by known diffusion methods, then depositing on said diffused layer by known methods an epitaxial layer of the same conductivity type as the diffused layer, then providing in said epitaxial layer a new junction either by a diffusion method or by the method of the barrier layer and then providing the adequate contacts on the two extreme faces of the detector and on the face which is common to the two detectors between the first diffused layer and the epitaxial layer.

Figure 2:
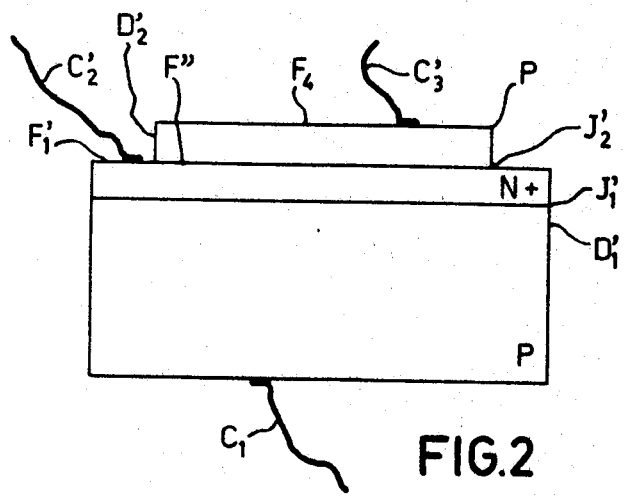

FIG. 2 diagrammatically shows a second embodiment of the invention in which $D_1'$ is the thick detector destined to absorb the energy of the incident particles and $D_2'$ denotes the thin detector destined for supplying the signal analogous to the differential coefficient of said energy for the value it has when the particle is incident. The detector $D_1'$ is constituted by a wafer of approximately 100 microns or more, said thickness determining the maximum energy range which the device can detect. In this wafer, the junction $J_1'$ has been provided by diffusion.

According to the present invention, this monolithic assembly has been obtained by first providing the junction $J_1'$ in a semiconductor wafer by known diffusion methods, then depositing on said diffused layer by known methods an epitaxial layer of a conductivity type opposite to that of the diffused layer, that is to say of the type of the original wafer.

The junction $J_2'$ thus obtained is that of the thin detector.

According to the energy range of the particles to be detected the epitaxial layer is constituted by the same semiconductor substance as the base plate or by a different substance. For example, germanium may be deposited on silicon.

By way of non-limiting example, the manufacture according to the first method of the invention of such a detection device with silicon will now be described. As starting element is chosen a wafer of 500 microns thickness of high resistivity and good crystalline quality. If the doping type of said wafer is the p-type, the impurity chosen is, for example, boron, the rate of doping being from $10^{12}$ to $10^{13}$ atoms per cm.$^3$ The effective thickness of the wafer is chosen in accordance with the energy of the incident particles: for example, to detect particles of 50 mev., the thickness of the wafer must be from 1 mm., while it may only be 80 microns for particles of 10 mev. The wafer is thus chosen to have a sufficient thickness in order that it can detect the particles to be discriminated having the greatest energy. Said wafer is subjected to the mechanical and chemical treatments commonly applied in the preparation of the surfaces.

In said wafer and on its whole surface the junction $J_1$ is made by diffusion as shown in FIG. 1. The choice of the doping element depends upon the method of depositing the epitaxial layer. If during this deposition, the wafer must be subjected to a prolonged heating, an element having a weak diffusion coefficient is chosen, for example, Sb, in the opposite case phosphorus may be used, for example. The diffused zone B thus provided is strongly doped, for which reason it is denoted n+ in the figure. It comprises, for example, on the surface, that is to say in the proximity of the face F, a rate of doping of $10^{20}$ atoms/cm.$^3$.

In this manner the thick detector denoted by $D_1$ in FIG. 1 is obtained.

On a large area of the diffused surface F of this detector an epitaxial layer is deposited. After an adequate preparation of the surface F a layer of n-type silicon of high resistivity is deposited by a known method on the whole surface F.

For example, a chemical method of deposition may be used in which case, as mentioned above, an element of weak diffusion coefficient is chosen as the doping element of the diffused layer, that is to say, in the present example antimony.

For the epitaxial deposition also an evaporation method under high vacuum may be used which permits of obtaining a deposited layer having a resistivity which is much higher and in the order of 1000Ω cm.

The epitaxial layer is doped during the deposition, for example, with phosphorus, its rate of doping being from $10^{13}$ to $10^{14}$ atoms per cm.$^3$. The thickness of the deposited layer advantageously is 2 or 3 microns, and at any rate less than 10 microns.

It is necessary to eliminate a part of said epitaxial layer to obtain on the surface of the diffused layer an area $F_1$ for providing an electric contact. For this purpose a photosensitive resin is deposited on the whole epitaxial layer which is removed on the zones to be eliminated and by etching said zones the area $F_1$ is detached from the surface F.

Alternatively, the epitaxial layer may be deposited in a different manner, namely through an adapted mask while avoiding the deposition on the area destined to receive the contact.

On the surface F' of the remaining part of the epitaxial layer, a layer p+ and the junction p/n $J_2$, which constitutes the thin detector, is provided by means of the method of the barrier layer. On this layer p+ a light metal layer for example, gold, destined to stabilize the junction is deposited by evaporation in a vacuum.

On an area of said metallization a contact $C_3$ is provided.

On the area $F_1$ of the surface F the composite contact $C_2$ is provided either by metallisation in a vacuum, or by a layer of silver paste. The contact $C_1$ is provided in the same manner on the surface of the zone p of the detector $D_1$.

This device may be used for the separation of nuclear and ionic particles and even for mass spectrometry.

As a second non-limiting example, the manufacture of the second embodiment according to the invention of a device with silicon will now be described. The wafer is chosen as in the first example, and the treatments are quite analogous. On this wafer, for example of the p-type, a junction $J_1'$ is provided by diffusion, the choice of the doping agent being made as above. In this manner the thick detector $D_1'$ of FIG. 2 is realized.

On a large area of the diffused surface $F''$ of this detector an epitaxial layer of p-type silicon of high resistivity is then provided in known manner. This epitaxial layer is doped during the deposition, for example, with boron, its rate of doping being from $10^{13}$ to $10^{14}$ atoms/cm.$^3$. The thickness of the deposited layer preferably is from 2 to 3 microns and at any rate less than 10 microns.

Like in the first example, it is then necessary to eliminate a part of this epitaxial layer to obtain an area $F_1'$ on the surface of the diffused layer which permits of providing a composite contact $C_2'$ located on the surface of the zone having the high conductivity $n^+$.

On the surface $F_4$ of the remaining part of the epitaxial layer, a light metal layer is deposited on which the contact $C_3'$ is provided. The contacts $C_2'$ and $C_1'$ will be provided as the contacts $C_2$ and $C_1$ shown in FIG. 1.

Of course, numerous variations in the embodiments described may be made without departing from the scope of this invention.

What is claimed is:

1. A method of manufacturing a nuclear particle detector comprising thin or thick superposed semiconductor detectors each having a junction to be polarized in the blocking direction, comprising the steps:
   (1) providing a relatively thick semiconductor substrate portion of relatively high resistivity and of one type conductivity,
   (2) forming on said substrate portion a first, relatively thin, surface region of relatively low resistivity and of the opposite type conductivity forming with the underlying substrate portion a first p-n junction as part of a thick detector for measuring the energy of incident particles,
   (3) epitaxially depositing on a surface of the first surface region a relatively thin layer of semiconductive material and of relatively high resistivity,
   (4) forming in or on said semiconductive layer a second p-n junction as part of a thin detector for measuring the differential coefficient of the incident particle energy with respect to the path traversed thereby in the detector, and
   (5) applying separate contacts to the substrate portion, the first surface region, and the epitaxial layer.

2. A method as set forth in claim 1 wherein the epitaxial layer is of said opposite type conductivity, and the second p-n junction is produced by diffusing active impurities into a surface of said epitaxial layer to form a second surface region of said one type conductivity and of relatively low resistivity.

3. A method as set forth in claim 1 wherein the epitaxial layer is of said opposite type conductivity, and the second p-n junction is provided by applying a substance to its surface to form a surface barrier layer.

4. A method as set forth in claim 2 wherein the arrangement of conductivity is $np^+pn^+$ or $pn^+np^+$.

5. A method as set forth in claim 1 wherein the epitaxial layer is of the said one type conductivity, and the second p-n junction is formed during deposition of the epitaxial layer.

6. A method as set forth in claim 1 wherein the first surface region is formed by diffusion of active impurities into the substrate.

7. A method as set forth in claim 6 wherein the epitaxial layer has a thickness less than 10 microns.

8. A method as set forth in claim 7 wherein the epitaxial layer is of the same material as the substrate.

References Cited
UNITED STATES PATENTS

| | | | |
|---|---|---|---|
| 3,131,098 | 4/1964 | Krek et al. | 148—175 |
| 3,131,305 | 4/1964 | Shombert | 148—175 |

DEWAYNE RUTLEDGE, Primary Examiner

R. A. LESTER, Assistant Examiner

U.S. Cl. X.R.

317—235

UNITED STATES PATENT OFFICE
CERTIFICATE OF CORRECTION

Patent No. 3511722            Dated May 12, 1970

Inventor(s) JOHANNES MEULEMAN

It is certified that error appears in the above-identified patent and that said Letters Patent are hereby corrected as shown below:

Column 2, line 18, "wafer results in a compromise between these two re-" should read --the wafer, the value of the thickness chosen for the said--.

line 19, "the wafer, the value of the thickness chosen for the said" should read --wafer results in a compromise between these two re- --.

Column 5, line 26, "or" should read --on--.

Signed and sealed this 22nd day of September, 1970.

(SEAL)
Attest:

Edward M. Fletcher, Jr.
Attesting Officer

WILLIAM E. SCHUYLER, JR.
Commissioner of Patents